UNITED STATES PATENT OFFICE.

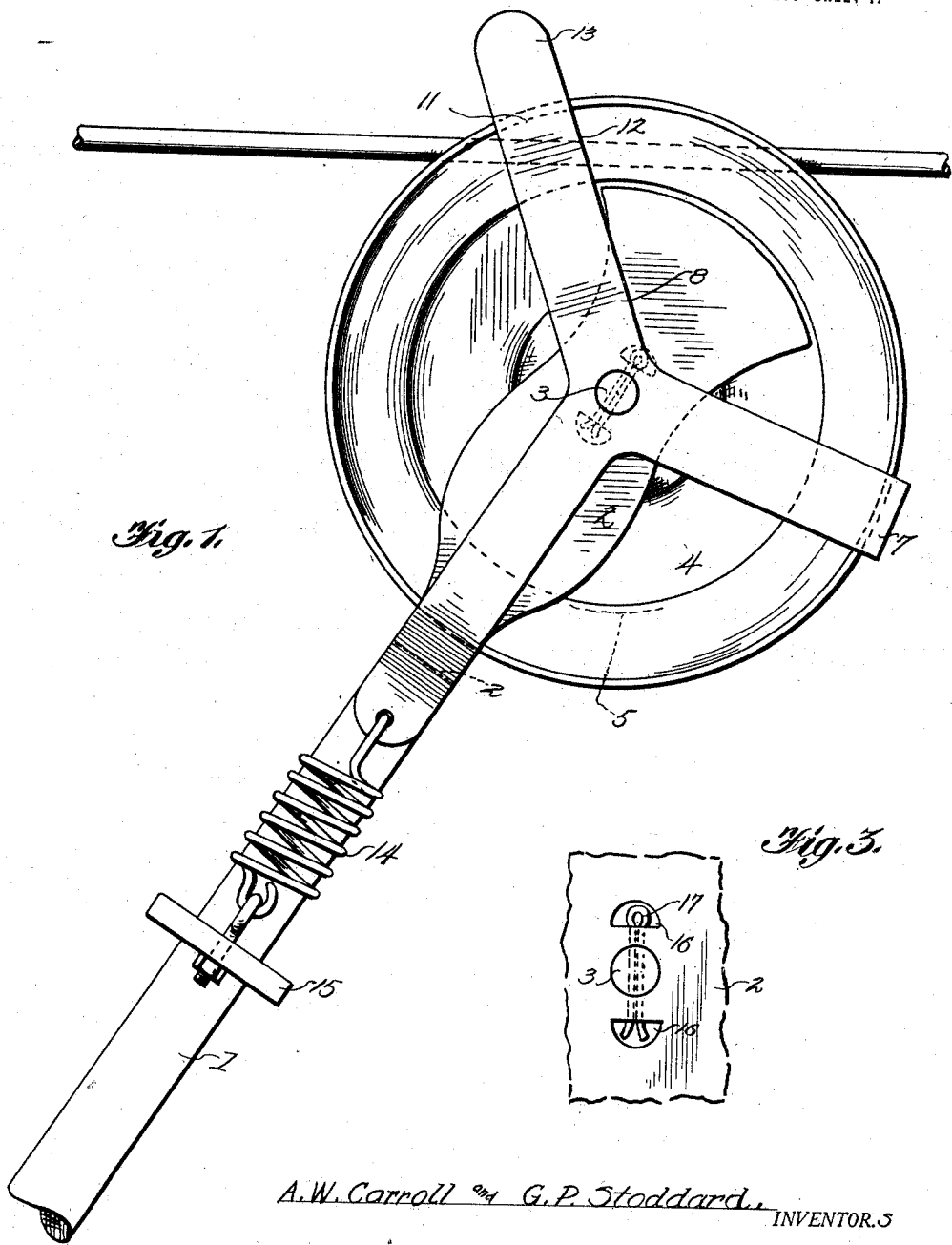

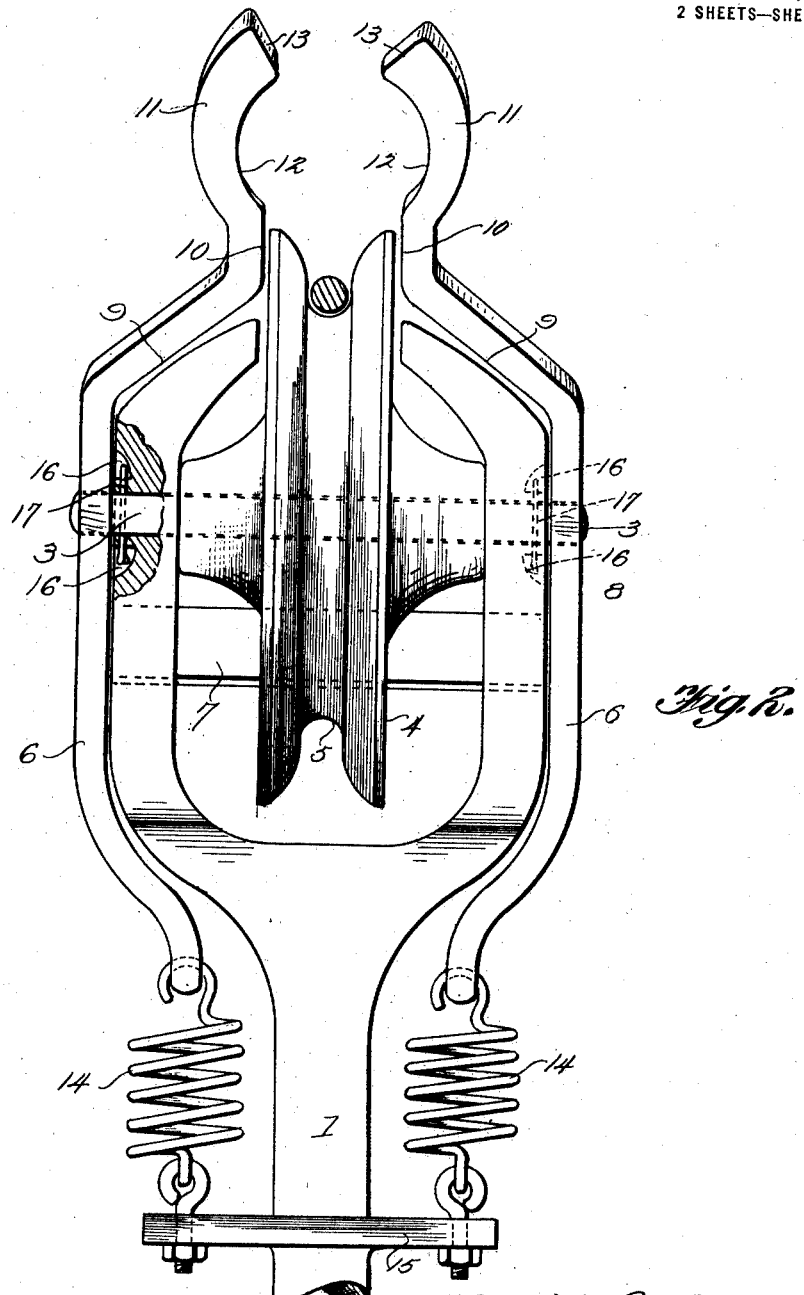

ARTHUR W. CARROLL AND GEORGE P. STODDARD, OF SEATTLE, WASHINGTON.

TROLLEY-POLE.

1,396,928.   Specification of Letters Patent.   Patented Nov. 15, 1921.

Application filed March 9, 1921. Serial No. 450,909.

*To all whom it may concern:*

Be it known that we, ARTHUR W. CARROLL and GEORGE P. STODDARD, citizens of the United States, and residing at Seattle, in the county of King and State of Washington, have invented certain new and useful Improvements in Trolley-Poles, of which the following is a specification.

This invention relates to an improvement in trolley wire replacers, wherein means are connected with the usual trolley harp, for directing the wire back into the groove of the trolley wheel in the event the wheel for any reason should leave the wire by accident.

The invention comprises a replacing member rotatively supported on the trolley wheel axle, and providing trolley wire deflectors normally projected above the trolley wheel. The member is yieldable against the tension of a spring and will permit comparatively free movement of the trolley wheel to and from the wire when changing connections. The deflectors however, act to restore the wire to the wheel, in the event of accidental separation of the wheel from the wire.

In the drawings:—

Figure 1 is a side elevation showing a trolley harp and wheel provided with the improved replacer.

Fig. 2 is a front elevation of the same.

Fig. 3 is a fragmentary section showing the means for holding trolley wheel axle in position in the harp.

The improved replacer is here shown as applied to an ordinary trolley pole contruction including a pole 1, a harp 2 in the arms of which is fixed an axle 3 supporting between the arms an ordinary trolley wheel 4 having a wire receiving groove 5.

The replacer comprises a member including arms 6 which are pivotally supported upon the extended ends of the axle 3, these arms being connected by transverse member 7, which projects from the arms proper at a downward and rearward inclination with respect to the trolley pole and then transversely of the harp. The arms 6 beyond the pivot mounting on the shaft 3 are formed with arm extensions 8, which project upwardly and forwardly with respect to the trolley pole, following the outline of the upper ends of the harp arm as at 9, and then extended parallel to the projecting edge of the trolley wheel above the harp arm as at 10, and then projected above the trolley wheel to form guides 11. The inner edge surface of each guide 11 is concaved or recessed at 12 substantially in continuation of the curvature of the wire groove of the trolley wheel. The concavity of the guides extend to the upper end of the inner edge thereof, the extreme upper ends of the guides being inclined sharply at 13 upwardly and outwardly with respect to the trolley wheel. A wire entrance space is thus provided between the guides through which the wire may pass in connecting the trolley wheel therewith in the usual manner, the inclined edges 13 serving to assist in this placement in an obvious manner.

The lower ends of the arms 6 are each connected by coil springs 14 to a bar 15 secured to the pole 1 below the harp portion, thus permitting a yielding of the replacing member under strain or the like incident to contact with the wire, and yet insure the return of the replacing member to operative position.

The arms 6 are mounted on the extended ends of the axle 3, and to provide for this mounting without interference, and at the same time permit convenient removal of the axle for removal of the trolley wheel, the outer surface of the harp arm above and below the axle 3 is recessed at 16 to provide for the reception of the respective ends of a cotter pin 17 for securing the axle against relative movement in the harp. This mounting permits the use of the cotter pin, while offsetting them from possible interference with the movement of the replacing member.

The transverse member 7 is provided as shown in Fig. 1 spaced substantially equidistant from the arms 6 and 8 and joins the arms at the two sides together for simultaneous operation.

This member 7 further acts as a balancing member, the arms 6 and 8 and the member 7 being so constructed that should the springs 14 be disconnected, the replacer will assume the position shown in Fig. 1 by gravity due to the disposition of the weight and will continue to operate regardless of the disconnection of the springs. The member 7 also acts as a stop member to engage the trolley pole and prevent the guides 11 from rotating around the axle, so that if the springs were disconnected and the wheel should jump off the wire and engage the guides, the rotation imparted thereto by the friction of the wire, in a clockwise movement is limited by the member 7 engaging with the trolley pole, so that it will quickly assume its normal position by gravity.

From the above description, it will be obvious that in the event the trolley wheel tends to jump the wire, such wire will be engaged by one or the other of the guides 11, and under the normal spring pressure on the trolley pole, the wire will be guided back into the wheel groove.

Claim:—

A trolley wire replacer, comprising a member pivotally supported upon a trolley wheel axle beyond the harp and having pairs of arms extending radially from the pivot and substantially equi-distant from each other, one pair of arms in normal position extending upwardly and forwardly and beyond the periphery of the trolley wheel to form guides, a second pair of arms projecting downwardly and forwardly adjacent the trolley pole, a bar secured to the trolley pole below the arms, and springs connecting the second pair of arms with the bar, and a third pair of arms extending rearwardly and downwardly and connected beyond the periphery of the trolley wheel to form a balance and stop to hold the member in normal operative position when the springs become disconnected, and also to cause the simultaneous operation of all the pairs of arms.

In testimony whereof we affix our signatures.

ARTHUR W. CARROLL.
GEORGE P. STODDARD.